United States Patent [19]
Dautel et al.

[11] 3,815,131
[45] June 4, 1974

[54] CW SURVEILLANCE RADAR SYSTEM

[75] Inventors: John D. Dautel, Rockville Centre;
Denis F. O'Leary, East Northport;
Hubbard C. Turner, Jr., Northport,
all of N.Y.

[73] Assignee: Sperry Rand Corporation, New York, N.Y.

[22] Filed: Nov. 29, 1971

[21] Appl. No.: 202,997

[52] U.S. Cl......... 343/5 PD, 340/258 A, 340/258 B, 343/7.7
[51] Int. Cl..... G01s 9/42, G08b 13/24, G08b 13/22
[58] Field of Search................ 343/5 PP, 5 PD, 7.7; 340/258 A, 258 B

[56] References Cited
UNITED STATES PATENTS

| | | | |
|---|---|---|---|
| 2,649,538 | 8/1953 | Marlowe et al................ | 343/5 DP |
| 3,343,167 | 9/1967 | Rademacher................... | 343/5 PD |
| 3,394,342 | 7/1968 | Walker............................ | 340/1 R |
| 3,512,155 | 5/1970 | Bloice............................. | 343/7.7 |
| 3,581,310 | 5/1971 | Buckley.......................... | 343/7.7 |
| 3,614,785 | 10/1971 | Kratzer........................... | 343/7.7 |

FOREIGN PATENTS OR APPLICATIONS

| | | | |
|---|---|---|---|
| 959,140 | 5/1964 | Great Britain.................. | 343/7.7 |

*Primary Examiner*—Malcolm F. Hubler
*Attorney, Agent, or Firm*—Howard P. Terry; Thomas J. Scott

[57] ABSTRACT

Two CW radars are positioned facing one another within a space which is to be closely guarded. Each radar is located within the transmitter beam of the other facing radar and operates at the same or a different CW frequency. A moving object within the surveillance space produces a doppler frequency shift in the echo return to each radar which produces a detected target signal. AND/OR logic gates responsive to the detected target signal from each radar provide an alarm or alert condition. The radar system has a resultant range versus object size characteristic over the surveillance space so that a small moving object such as a small animal will produce a detected signal in only one of the radars thereby indicating an alert condition while a large moving object such as a person will produce a detected signal in each of the radars thereby indicating an alarm condition. Radar returns from a large target, such as a vehicle, beyond the desired surveillance range will produce a detected signal in only one of the radars and will produce an alert but not an alarm condition.

6 Claims, 9 Drawing Figures

SINGLE RADAR CONFIGURATION
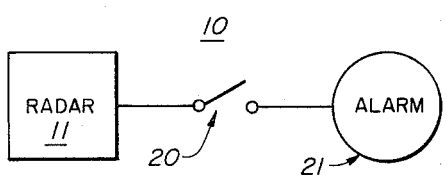
FIG. 4a.
DUAL RADAR CONFIGURATION
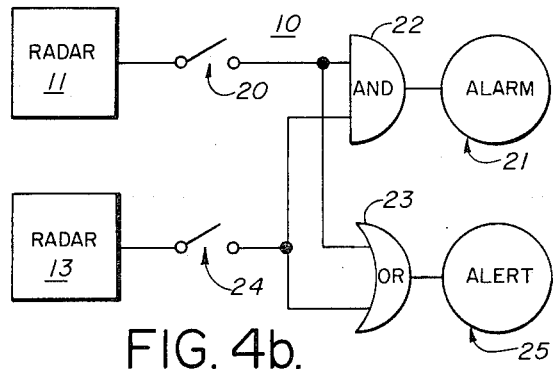
FIG. 4b.
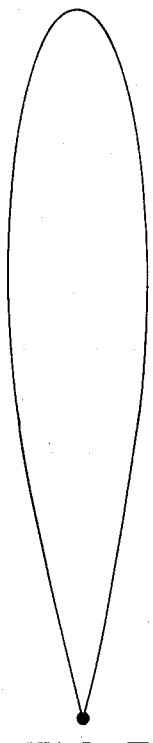
FIG. 5a.
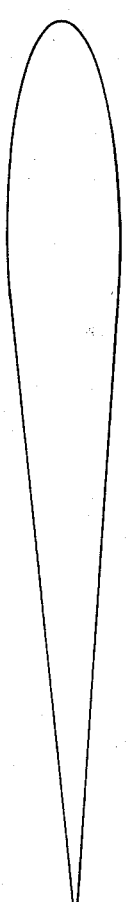
FIG. 5b.
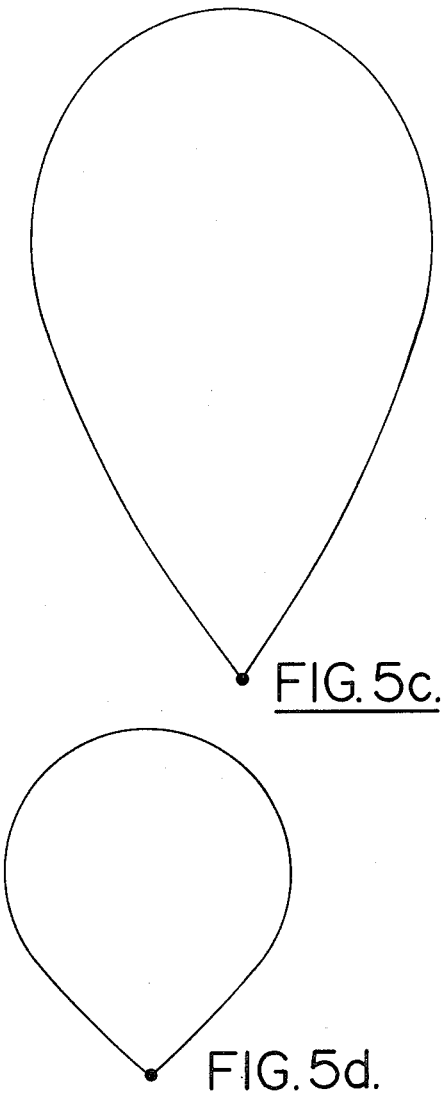
FIG. 5c.
FIG. 5d.

CW SURVEILLANCE RADAR SYSTEM

BACKGROUND OF THE INVENTION

1. Field of the Invention

The invention pertains to the field of surveillance systems and particularly those systems which utilize radars to provide monitoring of moving objects within a specified space.

2. Description of the Prior Art

There are many known devices in the prior art which provide surveillance of specific spaces such as the perimeter around military installations, defense plants, and other sites that have stringent security requirements. Presently there are two basic types of radar systems which are employed for this type of surveillance. Both types detect the presence of a moving object. The first type utilizes a doppler frequency shift which is introduced by the moving object to initiate an alarm. The second type utilizes the change in radar signal strength at the receiver caused by a moving object.

A majority of spaces to be protected by a perimeter intrusion radar system are also guarded by the presence of an inner and outer fence, usually of the chain-link type having a minimum height of seven feet. The distance between the inner and outer fences forms a corridor having a width of fifty to sixty feet in which the radars are positioned to provide surveillance of the space within the corridor. The fences restrict some small animals from straying into the radar surveillance corridor and thereby reduce the number of false alarms. They do not eliminate the problem because burrowing animals and birds can penetrate the surveillance corridor and cause false alarms. Further, wind blowing against the fences cause them to vibrate which can also produce false alarm indications.

The first type of radar system used in the prior art uses a transmitter and receiver located adjacent to each other at one end of the corridor to be guarded. The transmitter generates a CW signal that is radiated along the corridor and a return signal is received from any object located in the corridor. If the object within the corridor is stationary, the return signal will have the same frequency as the generated signal. A comparison of the transmitted and received frequency is made to determine if there is a doppler shift present between the transmitted and received frequencies. The frequency of the doppler shift will correspond to the velocity of the object moving within the corridor covered by the transmitted radar beam. The strength of the return signal is proportional to the size of the object and its distance from the transmitter. Threshold values are set within the radar so that an alarm will be initiated when the level of the signal return exceeds the value of the threshold level for frequencies within the passband of the radar.

A variation of this system employs a CW signal with frequency modulation (CW/FM), the transmitted signal is frequency modulated and detection is obtained from a comparison between the received and transmitted frequency modulated signal. The object size versus distance characteristic of both types of CW systems varies with the distance between the object and the transmitter; therefore these systems are subject to false alarms caused by small moving objects within the radar beam. The CW/FM system has an object size versus distance characteristic which is more linear than the CW system without frequency modulation for the same size moving object. Thus, it will have fewer false alarms. However, both systems are subject to the false alarms generated by a large target which is beyond the surveillance space but within the radar beam. Cost of the CW/FM system is estimated to be one and one-half to two times that of the basic CW system.

The second type of radar system used in the prior art employs a radar transmitter at one end of the surveillance corridor and a radar receiver at the other end. The receiver performs a function similar to that of a field intensity meter. With no target in the corridor the radar signal received by the receiver is a maximum. When an object intrudes into the corridor it blocks out a portion of the radar signal for the receiver and when the received signal drops below a selected threshold level an alarm is activated. The threshold level is set to correspond to a selected target size and type. This type of system is sensitive to objects that increase slowly in size such as snow and wind blown debris. For example, if the alarm threshold is set with a no-snow condition, a heavy snowfall or high snow drifts could attenuate the radar signal to the point where a false alarm would occur. This type of system is also susceptible to radar signal returns from large objects beyond the surveillance range if such signals can reach the receiver via multi-reflection paths. The cost of this system is estimated to be five to ten times that of the basic CW system.

A variation of the second type of radar system uses a first transmitter and a first receiver at one end of the radar surveillance corridor and a second transmitter and second receiver along with a modulator at the other end of the corridor. The first transmitter sends a CW signal to the second receiver which is modulated and retransmitted by the second transmitter to the first receiver. The first receiver is tuned to accept only the modulated signal. The problem of moving objects beyond the radars but within the radar beams is eliminated since objects beyond the surveillance space return unmodulated signals which are rejected by the first receiver. This system does not correct the snow and debris build up type of problem. The cost of this system is estimated to be ten to twenty times that of the basic CW system.

SUMMARY OF THE INVENTION

The present invention employs two radars which may be either of the CW/FM type or the CW only type. One of the pair of radars is positioned at each end of the corridor over which surveillance is to be maintained. Each radar is located within the transmitter beam of the other facing radar so that the corridor to be guarded is within the transmitted beam of each radar. The transmitted CW frequency of each radar can be the same frequency or can be shifted relative to the CW frequency of the other radar. Further, each radar of the pair of radars has an object size versus distance characteristic which is substantially the same. Therefore, the minimum size of a moving object within the corridor between the two radars that will provide an indication in both radars is substantially larger than the minimum size of a moving object that will produce a detected signal in only one of the radars. The detected signal produced in each radar is coupled to a logic AND gate which provides an output signal when both inputs to the AND gate are present. This output signal is used to indicate an alarm condition. In addition, each detected signal is coupled to an OR gate which provides an output signal when either detected input signal is applied to the input. This output signal is used to indicate an alert condition.

This pair of facing radars in combination with simple logic circuitry provides a relatively inexpensive system which substantially reduces the number of false alarms caused by small moving objects within the corridor and eliminates false alarms caused by large moving objects beyond the surveillance range but within the transmitter beam of either radar.

BRIEF DESCRIPTION OF THE DRAWINGS

FIG. 4a is a logic block diagram of a system using a single CW/FM or CW only radar;

FIG. 4b is a logic block diagram of a system using a pair of CW/FM or CW only radars.

FIGS. 5a–5d show typical beam patterns in the invention.

DESCRIPTION OF THE PREFERRED EMBODIMENT

Figure 1:
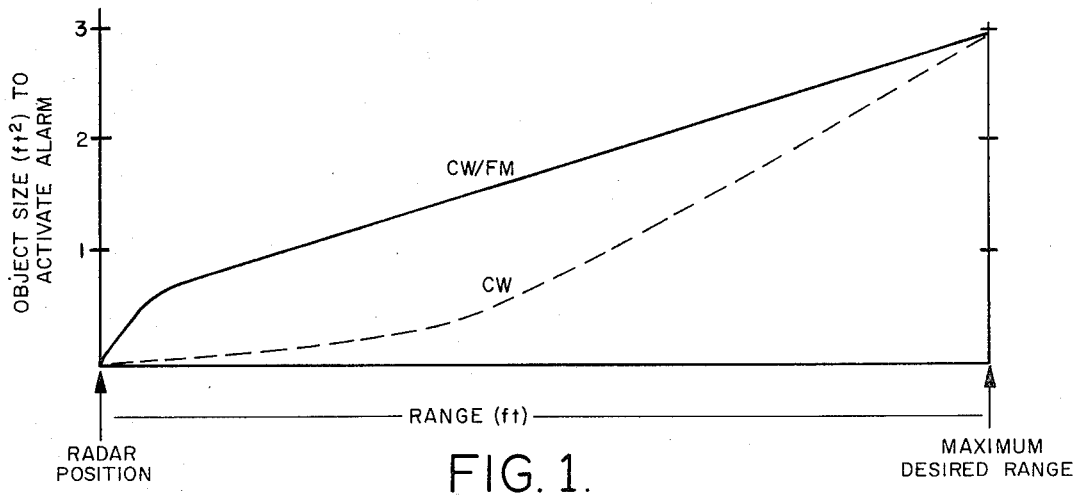
FIG. 1 is a graph of the object size versus distance of a CW/FM radar and a CW only radar.

As shown in FIG. 1 the object size versus distance characteristic of a single CW/FM radar or a CW only radar indicates that an object having a relatively small size, i.e. less than one square foot, will produce a detected signal indication in close proximity to the transmitter of the radar. Further, a moving object having a size less than two square feet will produce a detected signal in both radars at a point which is approximately halfway between the position of the transmitter and the maximum desired range. Therefore, a small animal such as a squirrel, fox or pigeon, moving in the corridor in the proximate vicinity of the radar, would produce a detected signal which, in fact, would be a false alarm. Further, a large target, i.e. greater than three square feet, such as an automobile or a truck, moving within the transmitter beam at a range beyond the maximum desired range, would produce a detected signal which would also be a false alarm indication.

Figure 2:
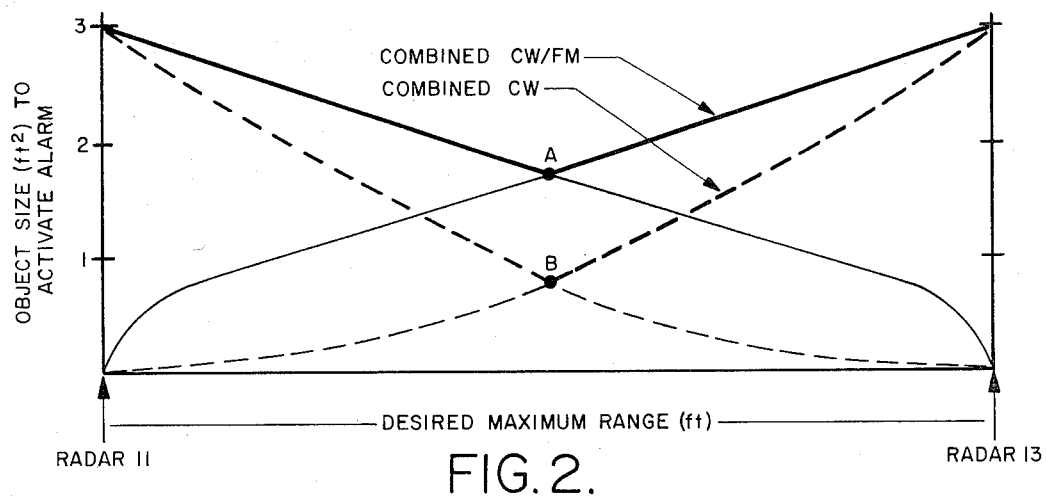
FIG. 2 is a graph which illustrates the combined target size versus distance characteristic of a pair of facing CW/FM radars and a pair of facing CW only radars.

However, a pair of CW/FM radars or a pair of CW only radars, positioned within the corridor to be guarded, and facing each other, would produce the object size versus distance characteristics shown in FIG. 2. The crossing point of the CW/FM radars is designated A and the crossing point of the CW only radars is designated B. For the pair of CW only radars the crossing point is approximately one square foot and for the pair of CW/FM radars, the crossing point is approximately two square feet. Thus, in order to produce a detected signal in each radar of the pair of CW radars, the moving object must have a size greater than one square foot and to produce a detected signal in the pair of CW/FM radars, the moving object must have a size greater than two square feet. In addition, a large moving object beyond the desired maximum range of either radar in either pair of radars will only produce a detected signal in only one of the radars in each pair of radars.

Figure 3:
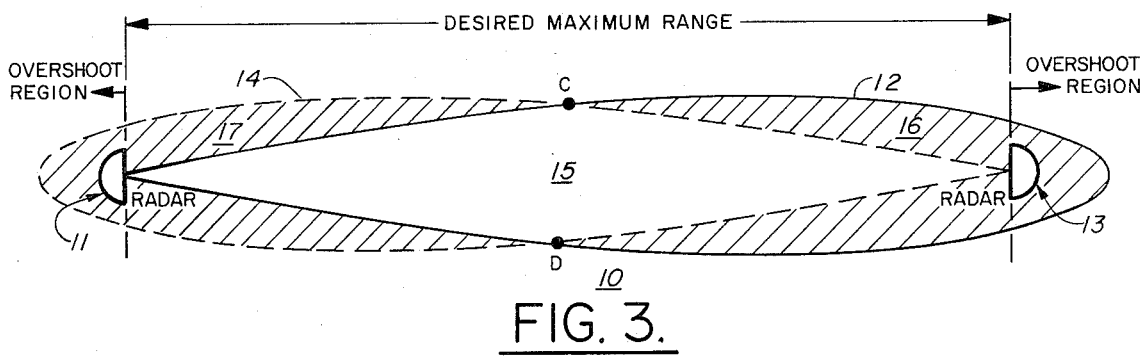
FIG. 3 is a graphical representation of the corridor coverage provided by a pair of CW/FM radars or a pair of CW only radars.

The radar system 10 as shown in FIG. 3 comprises a first radar 11 which produces a first transmitted radar beam 12 and a second radar 13 which produces a second radar beam 14. The radar beams 12 and 14 overlap to form the approximately diamond shaped area 15 which designates the surveillance corridor in which a moving object of sufficient size as determined by points A and B in FIG. 2 will produce a detected signal in both radars 11 and 13. The shaded area 16 indicates the area in which a moving object having a size greater than the size indicated by point B in FIG. 2 will produce a detected signal in radar 11 and the shaded area 17 indicates the area in which a moving object of a size greater than that indicated in FIG. 2 will produce a detected signal in radar 13. A moving object of a size smaller than that indicated at points A and B in FIG. 2 may produce a detected signal from radar 11 if it moves within the area 15 between the midpoint of the surveillance corridor and the radar 11. Likewise, if a small object of a size less than that indicated by points A and B in FIG. 2 moves in the area 15 between the midpoint of the corridor and the radar 13, it may produce a detected signal from the radar 13.

As shown in FIG. 4a, a radar system 10 using only a single radar 11, provides an output signal through a set of alarm contacts 20 to activate an alarm 21 whenever a moving object is present within the surveillance corridor. Since the single radar 11 has an object size versus distance characteristic as shown in FIG. 1, this system is susceptible to false alarms being produced by small animals in the proximity of the radar 11 or large moving objects beyond the desired maximum range but within the transmitted beam of the radar 11.

As shown in FIG. 4b, a radar system 10 includes a first radar 11 and a second radar 13. The first radar 11 produces a detected output signal which is coupled through alarm contacts 20 to a first input on an AND gate 22 and a first input on an OR gate 23. The second radar 13 produces a detected output signal which is coupled through alarm contacts 24 to a second input on the AND gate 22 and a second input on the OR gate 23. The output of the AND gate is coupled to an alarm device 21 while the output of the OR gate is coupled to an alert device 25.

Assuming the radars 11 and 13 combine to effect an object size versus distance characteristic as shown in FIG. 2, both radars 11 and 13 are CW/FM radars and the surveillance corridor corresponds to the diamond shaped area 15 in FIG. 3, then the operation of the radar system 10 will be as follows. An object having a size greater than two square feet which moves into the diamond-shaped area 15 will produce a doppler shift frequency in the echo return signals from the radars 11 and 13. The echo return signal is processed in the receiver section of the radars 11 and 13 to produce concurrent detected output signals from the radars 11 and 13 which are coupled through the alarm contacts 20 and 24 as shown in FIG. 4b to the first and second inputs of the AND gate 22. The AND gate 22 produces an output signal in response to the simultaneously received detected output signals from the radars 11 and 13 which is coupled to the alarm device 21 thereby providing an indication of the presence of a moving object having a size greater than two square feet in the surveillance corridor.

Reference to FIG. 3 shows that the detected output signals will be developed concurrently only when a moving object of the specified size enters the diamond-shaped area 15 at either point C or point D. At all other points of entry into the diamond-shaped area 15, it is necessary that the moving object first pass through an area which will produce a detected output signal in only one of the radars 11 or 13. Assuming the moving object of a size greater than two square feet enters the radar beam 12 transmitted by the radar 11 at a location between the midpoint of the surveillance corridor and the radar 13, then a detected output signal will be produced by the radar 11 only. The detected output signal will then be coupled through the alarm contacts 24 to the second input on the AND gate 22. However, since there is no detected output signal on the first input of the AND gate 22, this gate will not provide an output signal. The detected output signal from the radar 13 that is coupled through the alarm contacts 24 is also applied to the first input on the OR gate 23 which will provide an output signal when there is a detected output signal present on either the first or second input. The output signal produced by the OR gate 23 is applied to the alert device 25 which provides an indication of an alert condition. As the object moves through the radar beam 12 towards the diamond-shaped area 15 the alert condition is continuously provided. When the object moves into the diamond-shaped area 15 an alarm condition will also be indicated as described above. However, the alert condition will be simultaneously maintained.

An object having a size significantly greater than two square feet, which moves within the beam 12 but behind the radar 13 will produce a detected output signal from the radar 11 and, likewise, if an object of similar size moves within the beam 14 but behind the radar 11 it will produce a detected output signal from the radar 13. In most cases, only an alert condition will be indicated because the probability of moving objects occurring under these conditions simultaneously is minimum. However, if the radars are situated so that heavily travelled thoroughfares are located behind each radar 11 and 13 within the transmitted beams 12 and 14, then the probability of simultaneously occurring moving objects is increased. In installations where the occurrence of simultaneously moving large objects behind each radar within the beam of the facing radar is more than minimal, the false alarm indication may be eliminated by the addition of a simple range gating unit to either the radar 11 or the radar 13. This unit will provide a blanking pulse at a time commensurate with the range of the thoroughfare with respect to the transmitter and of a duration sufficient to provide blanking over the width of the thoroughfare.

In a test of one embodiment of the invention two CW/FM radars having a carrier frequency of 10 GHz, a modulation frequency within the range of 20 KHz to 30 KHz and an RF power output of 20 milliwatts were spaced at a desired maximum range of 250 feet between the radars 11 and 13. With this configuration an alert indication was provided in response to a man moving within the radar beam 12 at a distance between 10 and 20 feet behind radar 13. However, radar 13 did not detect the man and thus no false alarm was indicated. Further, a small dog moving within the surveillance corridor about 75 feet in front of the radar 11 did produce an alert indication from radar 11 but did not produce a detected output signal from radar 13. A man moving about 50 feet in front of radar 11 produced a detected output signal from both radars and an alarm indication was provided.

In a subsequent test of this embodiment of the invention, the same two radars described above were located between two chain link fences which were separated by a distance of approximately 50 feet and the desired maximum range between the radars was 300 feet. The radars provided an alarm indication when a man either crawled or walked across the surveillance corridor at different locations and at different speeds. An alert indication was provided when a simulated small animal passed across the protected area near radar 11 or passed across the protected area midway between the radars. Further, two men walking along the fences in unison and vigorously shaking the fences as they walked simulating wind blowing against the fence, did not produce an alarm indication.

To check the fail safe features of the system the power to radar 11 was removed causing alarm contact 20 to close and a system alert to be indicated. The system at this point was essentially that of a single CW/FM radar with radar 13 continuing to monitor the surveillance corridor. A man crossing the corridor was detected by radar 13 causing alarm contact 24 to close and causing a system alarm. The loss of one of the two radars causes the system to switch to a more sensitive mode with a corresponding increase in false alarm susceptibility. The loss of power to one radar would be detectable at the control console by a continuous alert signal from that radar. The simultaneous loss of both radars would cause a system alarm.

System specifications for range, target size, target velocity, transmitted power, beam width, etc. are governed by the specification of the radars used in the system.

Although the subject invention has been described as applied to providing surveillance of specific spaces such as the perimeter around a military installation and the preferable antenna beam pattern of the radars 11 and 13 for these applications are of the type shown at (a) of FIG. 5, it will be readily appreciated by those skilled in the art that various applications of the subject invention may be utilized by varying the patterns of the radar antenna beams. As examples, for use in narrow corridors within buildings, the antenna beam pattern may be narrowed to the type shown at (b) in FIG. 5. For surveillance of large rooms such as in museums, stores, banks, schools, hospitals and prisons radars having beam patterns as shown at (c) in FIG. 5 may be utilized. In applications to smaller rooms such as offices, a pattern similar to that shown at (d) in FIG. 5 would be more appropriate.

While the invention has been described in its preferred embodiments, it is to be understood that the words which have been used are words of description rather than limitation and that changes may be made within the purview of the appended claims without departing from the true scope and spirit of the invention in its broader aspects.

We claim:
1. A CW surveillance radar system comprising a
   a first CW radar having a first object size versus distance characteristic and a first transmitter which provides a first radar signal beam,
   a second CW radar having a second object size versus distance characteristic and a second transmitter located facing said first transmitter which provides a second radar signal beam whereby said first and second beams partially overlap to define a space to be guarded, a first receiver adjacent said first transmitter for producing a first output signal in response to doppler shifted echo signals produced by objects moving within said first signal beam and having sufficient size and distance from said first transmitter to exceed said first characteristic, a second receiver adjacent said second transmitter for producing a second output signal in response to doppler shifted echo signals produced by objects moving within said second signal beam and having sufficient size and distance from said second transmitter to exceed said second characteristic and logic circuit means coupled to said first and second receivers for providing an alert indicator output signal when only one of said receivers produces an output signal and providing an alarm indicator output signal when said first and second receivers produce concurrent output signals.

2. A CW surveillance radar system as described in claim 1 in which said first and second transmitters each include means for frequency modulating said first and second radar signal beams.

3. A CW surveillance radar system as described in claim 1 in which said first transmitter provides a first radar signal beam having a first frequency and said second transmitter provides a second radar signal beam having a second frequency.

4. A CW surveillance radar system as described in claim 3, in which said first and second transmitters include means for frequency modulating said first and second radar signal beams of said first and second frequencies.

5. A CW surveillance radar system as defined in claim 1 in which said logic circuit means includes an AND gate whereby the combination of said first and second CW radars co-act with said AND gate to provide a combined object size versus distance characteristic having improved linearity.

6. A CW surveillance system as described in claim 5 in which said logic circuit means further includes an OR gate.

* * * * *